US008820760B2

(12) United States Patent
Aalderink et al.

(10) Patent No.: US 8,820,760 B2
(45) Date of Patent: Sep. 2, 2014

(54) WHEEL AXLE SUSPENSION

(71) Applicant: VDL Weweler B.V., Apeldoorn (NL)

(72) Inventors: Derk Geert Aalderink, Laren (NL); Rutger William Tijhuis, Deventer (NL); Paulus Kruijer, Zwolle (NL)

(73) Assignee: VDL Weweler B.V., Apeldoorn (NL)

( * ) Notice: Subject to any disclaimer, the term of this patent is extended or adjusted under 35 U.S.C. 154(b) by 0 days.

(21) Appl. No.: 13/722,941

(22) Filed: Dec. 20, 2012

(65) Prior Publication Data

US 2013/0168940 A1  Jul. 4, 2013

Related U.S. Application Data

(60) Provisional application No. 61/580,852, filed on Dec. 28, 2011.

(51) Int. Cl.
*B60G 9/02* (2006.01)
*B60G 9/00* (2006.01)
*B60G 11/46* (2006.01)

(52) U.S. Cl.
CPC ............ *B60G 9/003* (2013.01); *B60G 2200/31* (2013.01); *B60G 2204/4306* (2013.01)
USPC ........... 280/124.116; 280/124.175; 301/124.1

(58) Field of Classification Search
CPC .................... B60G 9/02; B60G 9/003
USPC ..................... 280/124.116, 124.175, 124.17; 301/124.1
See application file for complete search history.

(56) References Cited

U.S. PATENT DOCUMENTS

| 1,539,070 | A | | 5/1925 | Brown | |
| 2,129,656 | A | * | 9/1938 | Dougherty | 267/52 |
| 2,745,661 | A | * | 5/1956 | Van Raden | 267/52 |

(Continued)

FOREIGN PATENT DOCUMENTS

| DE | 297 13 996 U1 | 12/1998 |
| EP | 0 590 528 A1 | 4/1994 |

(Continued)

OTHER PUBLICATIONS

International Search Report and Written Opinion, dated Jul. 3, 2012, for Dutch Patent Application No. NL2008050, European Patent Office, Rijswijk, Netherlands, 12 pages.

(Continued)

*Primary Examiner* — Karen Beck
(74) *Attorney, Agent, or Firm* — Sterne, Kessler, Goldstein & Fox P.L.L.C.

(57) ABSTRACT

A wheel axle suspension comprises an axle body, a flexible trailing arm extending crosswise to the axle body, an axle pad arranged between the axle body and the trailing arm, and a clamping assembly for tightening the axle body, the axle pad and the trailing arm together. The axle body is provided with an elongated indent in the region where it is clamped, which indent extends in a longitudinal direction of the axle body. The axle pad has an elongate protrusion that fits in the indent in the axle body. The axle pad furthermore has a rigid rear portion, which comprises a rear engagement zone engaging on the rear half of the axle body, and a front portion which comprises a front engagement zone engaging on the front half of the axle body. The axle pad comprises a flexible intermediate portion interconnecting the front and the rear portion.

14 Claims, 11 Drawing Sheets

(56) References Cited

U.S. PATENT DOCUMENTS

| | | | |
|---|---|---|---|
| 3,494,609 A * | 2/1970 | Harbers, Jr. | 267/52 |
| 3,773,347 A * | 11/1973 | Traylor | 280/124.116 |
| 4,322,061 A * | 3/1982 | Masser | 267/269 |
| 5,328,159 A * | 7/1994 | Kaufman et al. | 267/52 |
| 5,634,656 A * | 6/1997 | Banks | 280/86.75 |
| 6,364,333 B1 * | 4/2002 | Atkinson | 280/124.175 |
| 6,406,008 B1 * | 6/2002 | Dudding et al. | 267/52 |
| 6,508,482 B2 * | 1/2003 | Pierce et al. | 280/124.116 |
| 6,910,681 B1 * | 6/2005 | Hitt et al. | 267/52 |
| 7,066,479 B2 * | 6/2006 | Melton | 280/124.11 |
| 7,954,833 B1 * | 6/2011 | Heath et al. | 280/124.116 |
| 8,029,008 B2 * | 10/2011 | Cortez et al. | 280/124.175 |
| 8,177,246 B2 * | 5/2012 | Cortez et al. | 280/124.175 |
| 8,226,099 B2 * | 7/2012 | Koschinat | 280/124.116 |
| 8,454,040 B2 * | 6/2013 | Westnedge et al. | 280/124.116 |
| 8,540,262 B2 * | 9/2013 | Reiter et al. | 280/124.156 |
| 8,573,568 B2 * | 11/2013 | Henksmeier et al. | 267/52 |
| 2006/0244236 A1 * | 11/2006 | Cortez et al. | 280/124.175 |
| 2006/0267305 A1 * | 11/2006 | Melton | 280/124.175 |
| 2008/0252031 A1 * | 10/2008 | Dudding et al. | 280/124.116 |
| 2012/0228847 A1 * | 9/2012 | Aalderink | 280/124.116 |
| 2013/0168940 A1 * | 7/2013 | Aalderink et al. | 280/124.116 |

FOREIGN PATENT DOCUMENTS

| | | | |
|---|---|---|---|
| EP | 0 810 109 A1 | | 12/1997 |
| EP | 0 830 957 A2 | | 3/1998 |
| EP | 1 273 464 | | 1/2003 |
| EP | 1273464 A1 | * | 1/2003 |
| EP | 1 334 848 A1 | | 8/2003 |
| EP | 1 439 081 A1 | | 7/2004 |
| EP | 1439081 A1 | * | 7/2004 |
| EP | 1508459 A1 | * | 2/2005 |
| EP | 2130688 A1 | * | 12/2009 |
| EP | 1508459 B1 | * | 11/2010 |
| EP | 2363302 A1 | * | 9/2011 |
| WO | WO 2011/059312 A1 | | 5/2011 |
| WO | WO 2011059312 A1 | * | 5/2011 |

OTHER PUBLICATIONS

English language Abstract for European Patent Publication No. EP 1 334 848 A1, published Aug. 13, 2003, European Patent Office, Espacenet—Bibliographic data 1 page.

Unverified, machine-generated English language translation of an Abstract of the German Patent Publication No. DE 297 13 996 U1, Google Translate, accessed on Dec. 20, 2012, 1 page.

English language Abstract for European Patent Publication No. EP 0 590 528 A1, published Apr. 6, 1994, European Patent Office, Espacenet—Bibliographic data, 1 pages.

English language Abstract for European Patent Publication No. EP 0 830 957 A2, published Mar. 25, 1998, European Patent Office, Espacenet—Bibliographic data, 2 pages.

* cited by examiner

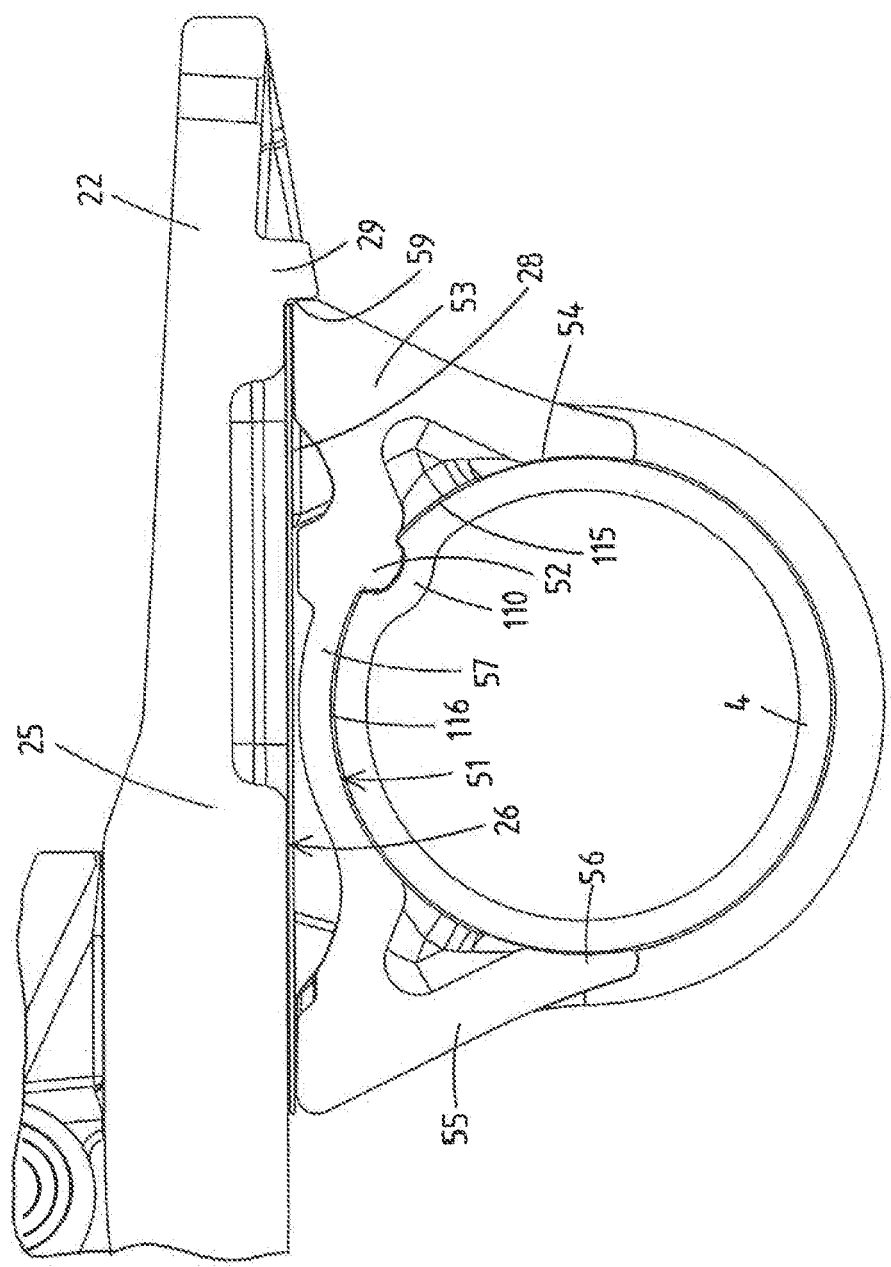

WHEEL AXLE SUSPENSION

BACKGROUND

1. Technical Field

The present invention relates to the field of wheel axle suspensions for attaching a wheel axle to a vehicle chassis.

2. Related Art

The present invention relates to a wheel axle suspension for attaching a wheel axle to a vehicle chassis, comprising:
- a round tubular axle body,
- a flexible trailing arm with a front end that is hingedly coupled to the chassis and which extends crosswise to the axle body,
- an axle pad which is arranged between the axle body and the trailing arm, which has a recess in which part of the circumference of the axle body is received, and which has a side facing away from the axle body that engages the trailing arm,
- a clamping assembly extending around the axle body for tightening the axle body, the axle pad and the trailing arm together.

Trailing arms of the type used in the invention may be made by rolling, forging or another suitable forming method. They have a resilient portion between the hingedly attached front end, usually constituted by an attachment eye, and the portion where the axle body is attached to it. This resilient portion provides the flexibility to withstand roll movements of the vehicle.

Many examples of wheel axle suspensions of the above mentioned type are known in the art.

BRIEF SUMMARY

The present invention has for an object to provide an alternative wheel axle suspension.

This object is achieved, for example, by a wheel axle suspension according to claim 1.

According to the invention the axle body is provided with an elongated indent in the region where it is clamped, which indent extends in a longitudinal direction of the axle body. The axle pad has an elongate protrusion located in the recess of the axle pad, which protrusion fits in the indent in the axle body. Furthermore, the axle pad has rigid rear portion which comprises a rear engagement zone which engages on the rear half of the axle body and a front portion, which comprises a front engagement zone which engages on the front half of the axle body. Moreover, the axle pad comprises a flexible intermediate portion interconnecting the front and the rear portion. By this structure the axle pad provides a univocal seating for the axle body, which allows the compensation of tolerances in the axle shape and dimension. The elongate protrusion of the axle pad, which is received in the elongate indent of the axle body, locks the axle body with respect to the axle pad, such that rotation caused by torsional forces are prevented. The torsional forces may be induced in the axle body by roll movements of the vehicle.

Preferably, the indent—which in a possible embodiment has a substantially cylindrical concave surface—has a front contact surface, a rear contact surface and a bottom surface connecting said front and rear contact surfaces, and the elongate protrusion is shaped in such a way that in the mounted state it only contacts said front and rear contact surfaces of the indent. Preferably the protrusion has a wedge shape. With this structure, in which the protrusion has a cross sectional contour which does not correspond with the cross sectional contour of the indent, the protrusion does not make contact with the bottom of the indent, but is held as if it were clamped between the front and rear contact surfaces. This provides a stable seating of the protrusion in the indent, which does not allow shifting in the tangential direction of the protrusion in the indent. Tolerances in the shape and dimensions of the indent are compensated by the shape of the protrusion. Thereby the protrusion forms a stable supporting point for the axle body.

Preferably, the elongate protrusion is located at the rigid rear portion of the axle pad. The rigid rear portion has sufficient strength to absorb the torsional loads applied to it via the protrusion.

The recess of the axle pad has an axle body facing surface, which axle body facing surface comprises said front and the rear engagement zone, and furthermore has a zone between the front engagement zone and the protrusion where the axle body facing surface and the outer surface of axle body are spaced apart, as well as a zone between the rear engagement zone and the protrusion where the axle body facing surface and the outer surface of axle body are spaced apart.

In a preferred embodiment of the suspension according to the invention the flexible trailing arm is substantially straight at the portion thereof where the axle body is attached to it.

Under the loads occurring in the structure during operation, the axle body with the axle pad will have the tendency to shift rearwards in longitudinal direction of the trailing arm. With such a straight attachment portion of the trailing arm it is necessary to prevent that the axle pad with the axle body will shift since this could cause severe damage and dangerous situations.

In one embodiment which is envisaged for preventing the mentioned shifting of the axle pad and axle body with respect to the trailing arm, the clamping assembly comprises clamping straps as well as a strap plate which lies on a side of the trailing arm opposite the side where the axle pad is located, wherein the strap plate has side portions that extend along the side of the trailing arm towards the axle pad, and wherein the axle pad has transversal lugs, that engage the side portions of the strap plate so as to mutually lock the strap plate and the axle pad in a longitudinal direction of the trailing arm, and wherein the strap plate has at least one locking lug and the trailing arm has at least one recess which receives the locking lug of the strap plate, so as to lock the strap plate with respect to the trailing arm in the longitudinal direction of the trailing arm.

In another embodiment which is envisaged for preventing the mentioned shifting of the axle pad and axle body with respect to the trailing arm, the trailing arm has transversely extending ears on either side of the arm, wherein the axle pad has transversal lugs that engage the ears so as to position the axle pad in a predetermined longitudinal position on the trailing arm.

The mentioned ears on the trailing arm are preferably each provided with a bore through which passes a shank of a tightening member, preferably a clamping strap.

The mentioned transversal lugs are preferably provided on the rigid rear portion of the axle pad. The rigid rear portion has sufficient strength to absorb the forces applied to it via the lugs as a result of the tendency of the axle pad with the axle to shift rearwardly.

In yet another embodiment which is envisaged for preventing the mentioned shifting of the axle pad and axle body with respect to the trailing arm, the trailing arm is provided with a recessed surface area in its lower side in which a portion of the axle pad is received so as to position the axle pad in a predetermined longitudinal position on the trailing arm.

Another aspect of the invention relates to a wheel axle suspension for attaching a wheel axle to a vehicle chassis, comprising:
- a round tubular axle body,
- a flexible trailing arm with a front end that is hingedly coupled to the chassis and which extends crosswise to the axle body,
- an axle pad which is arranged between the axle body and the trailing arm, which has a recess in which part of the circumference of the axle body is received, and which has a side facing away from the axle body that engages the trailing arm,
- a clamping assembly extending around the axle body for tightening the axle body, the axle pad and the trailing arm together,
- wherein the axle body is provided with an elongated indent in the region where it is clamped, which indent extends in a longitudinal direction of the axle body,
- wherein the axle pad has an elongate protrusion located in the recess, which protrusion fits in the indent in the axle body, and
- wherein the indent has a front contact surface, a rear contact surface and a bottom surface connecting said front and rear contact surfaces, wherein the elongate protrusion is shaped in such a way that in the mounted state it only contacts said front and rear contact surfaces of the indent.

According to this aspect of the invention, in which the protrusion has a cross sectional contour which does not correspond with the cross sectional contour of the indent, the protrusion does not make contact with the bottom of the indent, but acts as if it were clamped between the front and rear contact surfaces. This provides a stable seating of the protrusion in the indent, which does not allow shifting in the tangential direction of the protrusion in the indent. Tolerances in the shape and dimensions of the indent are compensated by the shape of the protrusion. Thereby the protrusion forms a stable supporting point for the axle body.

Preferably, the axle pad has at the recess an axle body facing surface, which does not contact the axle body in the region adjacent the indent. Thus a gap is present between the axle body facing surface and the outer surface of the axle body near the indent. This warrants a more secure abutment of the respective protrusion surfaces on the relevant indent contact surfaces in the axle body.

Yet another aspect of the invention relates to a wheel axle suspension for attaching a wheel axle to a vehicle chassis, comprising:
- a round tubular axle body,
- a flexible trailing arm with a front end that is hingedly coupled to the chassis and which extends crosswise to the axle body,
- an axle pad which is arranged between the axle body and the trailing arm, which has a recess in which part of the circumference of the axle body is received, and which has a side facing away from the axle body that engages the trailing arm,
- a clamping assembly extending around the axle body for tightening the axle body, the axle pad and the trailing arm together,
- wherein the axle body is provided with an elongated indent in the region where it is clamped, which indent extends in a longitudinal direction of the axle body, wherein the axle pad has an elongate protrusion located in the recess, which protrusion fits in the indent in the axle body,
- wherein the clamping assembly comprises clamping straps as well as a strap plate which lies on a side of the trailing arm opposite the side where the axle pad is located, wherein the strap plate has side portions that extend along the side of the trailing arm towards the axle pad, and wherein the axle pad has transversal lugs, that engage the side portions of the strap plate so as to mutually lock the strap plate and the axle pad in a longitudinal direction of the trailing arm, and wherein the strap plate has at least one locking lug and the trailing arm has at least one recess which receives the locking lug of the strap plate, so as to lock the strap plate with respect to the trailing arm in the longitudinal direction of the trailing arm.

The invention furthermore relates to a vehicle, such as a trailer or a lorry, which comprises a wheel axle suspension as described in the above.

BRIEF DESCRIPTION OF THE DRAWINGS

The invention will be further elucidated in the following detailed description with reference to the drawing, in which:

FIG. 6B shows a longitudinal section of the wheel axle suspension with the trailing arm of FIG. 6A.

FIGS. 1-4 show in different views a possible embodiment of an air-sprung wheel axle suspension according to the invention. For each axle, a wheel axle suspension as shown is provided on either side of the vehicle.

DETAILED DESCRIPTION

The wheel axle suspension comprises a carrier bracket 1 with two side plates 11. The carrier bracket 1 is at its upper end attached to the vehicle chassis 10, which is schematically indicated by dashed lines in FIG. 3.

Figure 1:
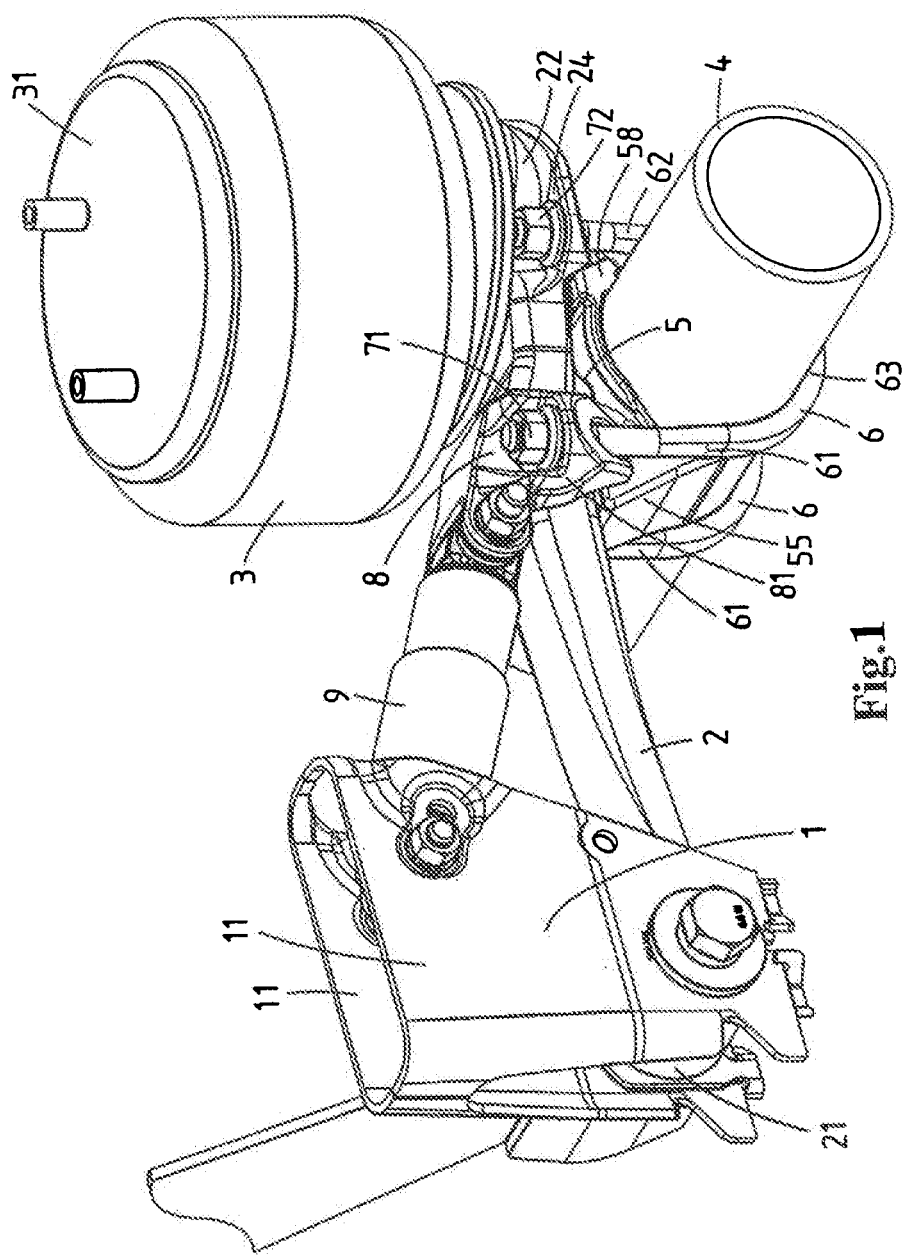
FIG. 1 shows a view in perspective of a possible embodiment of a wheel axle suspension according to the invention.
Figure 2:
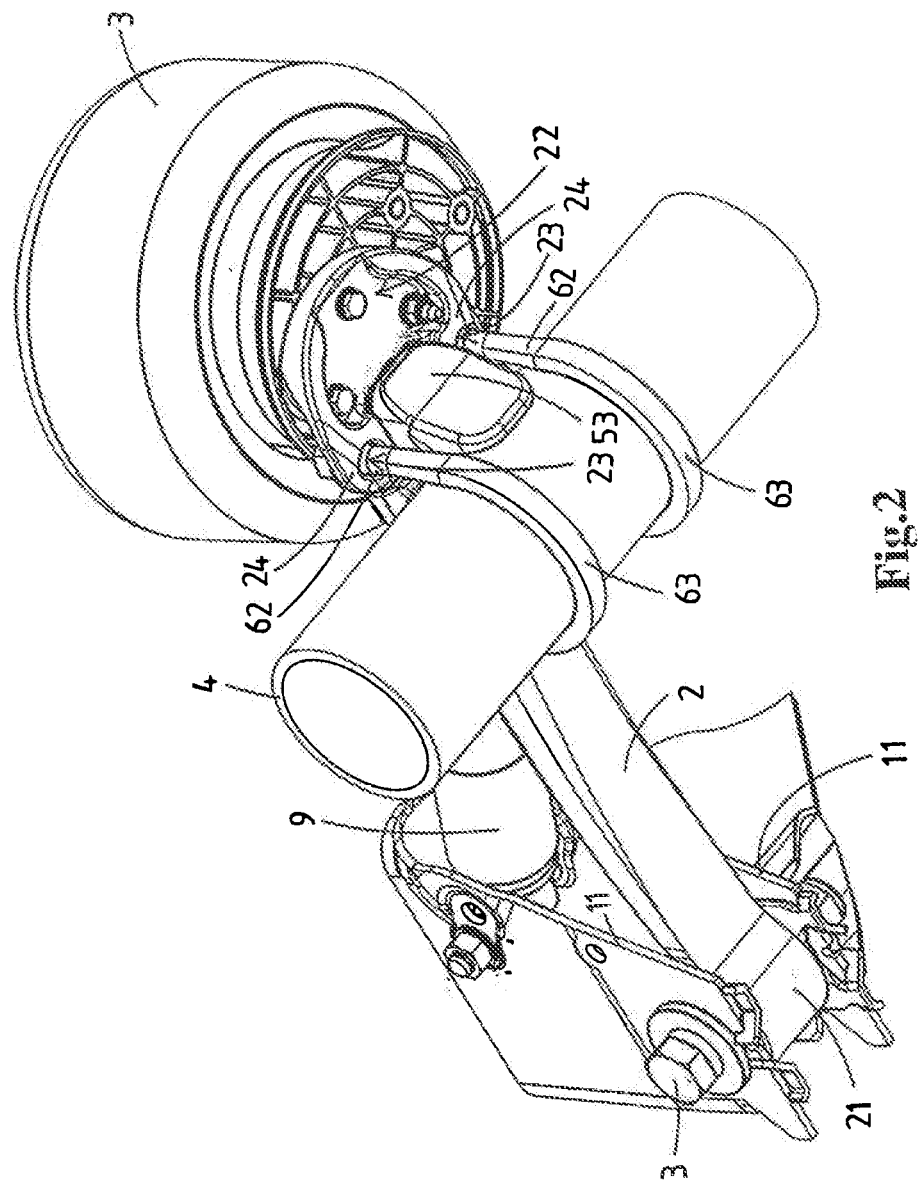
FIG. 2 shows a view in perspective from below of the wheel axle suspension of FIG. 1.
Figure 3:
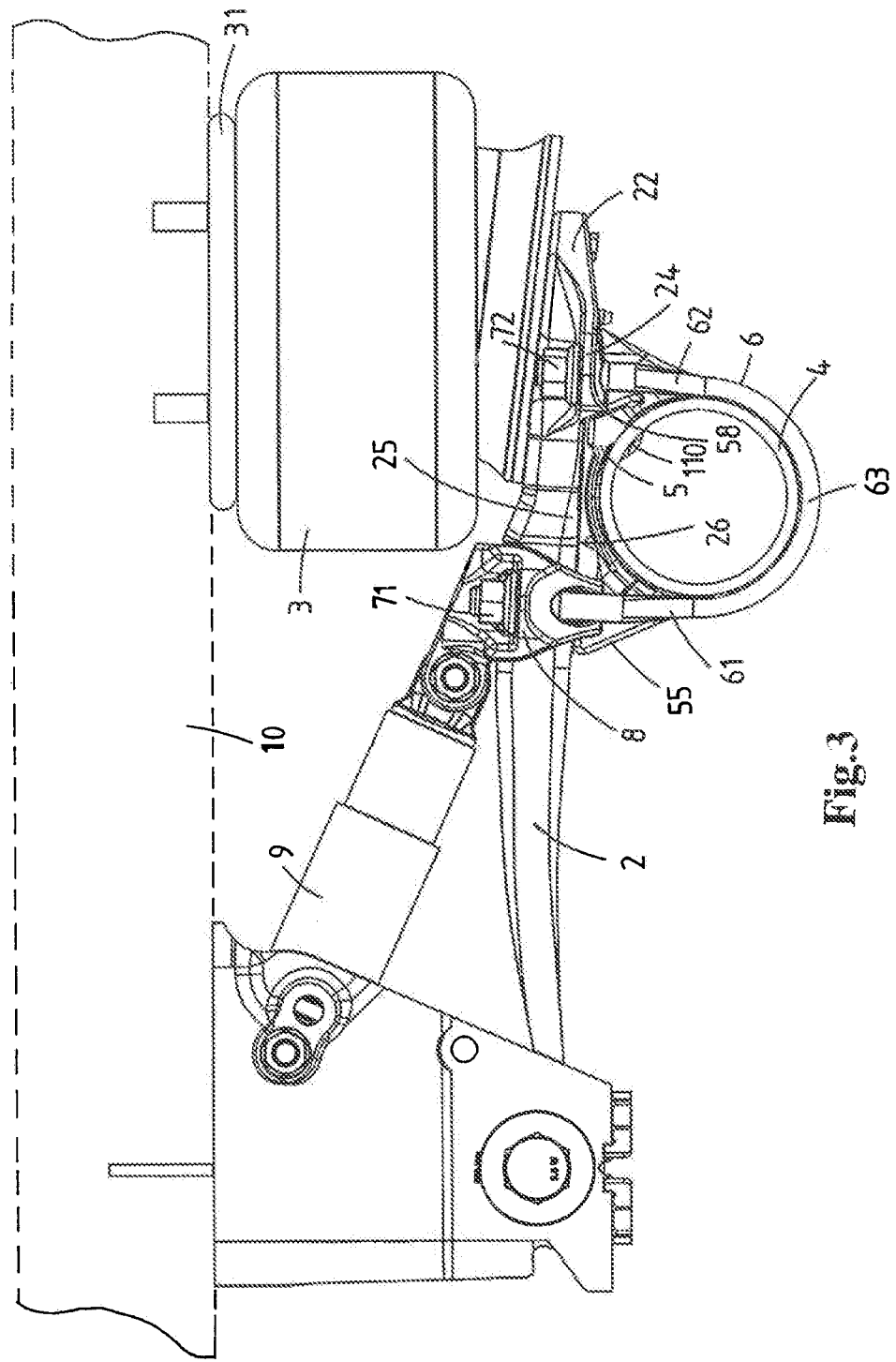
FIG. 3 shows a side view of the wheel axle suspension of FIG. 1.
Figure 4:
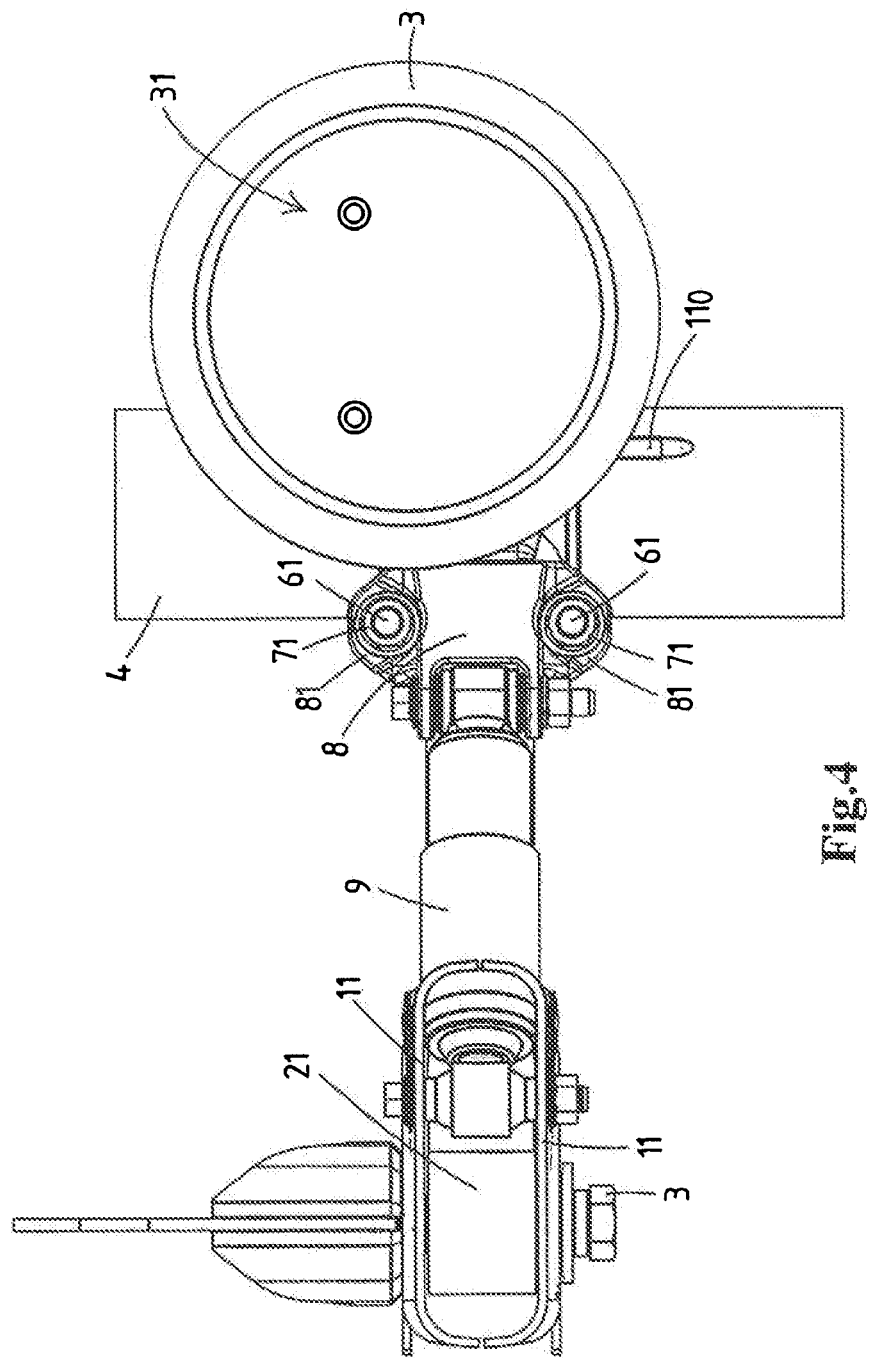
FIG. 4 shows a top elevational view of, the suspension of FIG. 1.

The suspension assembly furthermore comprises a flexible trailing arm 2. The trailing arm 2 has at its front end an attachment eye 21. The trailing arm 2 is hingedly attached to the carrier bracket 1 by a hinge bolt 3 that extends through the attachment eye 21 and bores in the side plates 11 of the carrier bracket 1. Trailing arms of this type may be made by rolling, forging or another suitable forming method. The portion indicated by reference numeral 2 in the FIGS. 1-3 is resilient and provides the flexibility to withstand roll movements of the vehicle.

The suspension assembly also comprises an air spring 3 (or bellows), which is attached to a rear end 22 of the trailing arm 2. The air spring 3 has an upper side 31 that is attached to a part of the vehicle chassis 10.

A hollow, relatively thin-walled axle body 4 is provided, which is attached to the trailing arm 2 by means of a clamping assembly. In the shown embodiment, the axle body 4 crosses the trailing aim 2 substantially perpendicularly at an attachment portion 25 of the trailing arm. The attachment portion 25, or at least the side 26 of the trailing arm attachment portion 25 that faces the axle body 4 is straight.

An axle pad 5 is provided between the axle body 4 and the trailing arm 2. The axle pad 5 engages at an upper side the lower side of the trailing arm 2. The axle pad 5 has at a side facing away from the trailing arm 2 a recess in which part of the circumference of the axle body 4 is received. This is clearly visible in the FIGS. 1 and 2.

The clamping assembly comprises clamping straps 6, which in the embodiment shown are formed as substantially U-shaped straps with a front leg 61 and a rear leg 62 which are interconnected by a bent portion 63 that extends around the lower half of the circumference of the axle body 4. The legs 61 and 62 of the U-shaped straps 6 have near their free ends a threaded portion which can cooperate with a threaded nut 71, 72 respectively so as to tighten the straps 6, in particular the bent portion 63 thereof against the axle body 4.

The clamping assembly also includes a front clamping part which is called a strap plate 8 here. The strap plate 8 extends over the upper side of the trailing arm 2 in the width direction and has two side portions 81 that extend beyond the respective sides of the trailing arm 2. The side portions 81 are provided with through bores through which the front legs 61 of the straps 6 pass. The corresponding nuts 71 that are screwed on the front legs 61 of the straps 6 engage an upper side of the strap plate 8, i.e. the side facing away from the trailing arm. The strap plate 8 thus constitutes a counter element for allowing to tighten the axle 4, the axle pad 5 and the trailing arm 2 together at the front end of the clamping assembly. Because a strap plate 8 is used, there are no through bores necessary in the trailing arm 2 at that location. Thereby the flexible trailing arm 2 is not weakened by bores at a location which during use under road conditions is typically subjected to high loads and stresses.

A damper 9 extends between the strap plate 8 and the carrier bracket 1 and is attached thereto. The damper 9 is not really relevant for the present invention.

The rear legs 62 of the straps 6 are passed through bores 23 (cf. FIG. 2) which are provided in the trailing arm 2 itself. These bores 23 are located just behind the location where the axle body 4 crosses the trailing arm 2.

The front legs 61 of the straps 6 may have different length than the rear legs 62, depending on the specific structure of the wheel axle suspension. In the embodiment shown in FIGS. 1-4, the front legs 61 are longer than the rear legs 62.

Figure 5A:
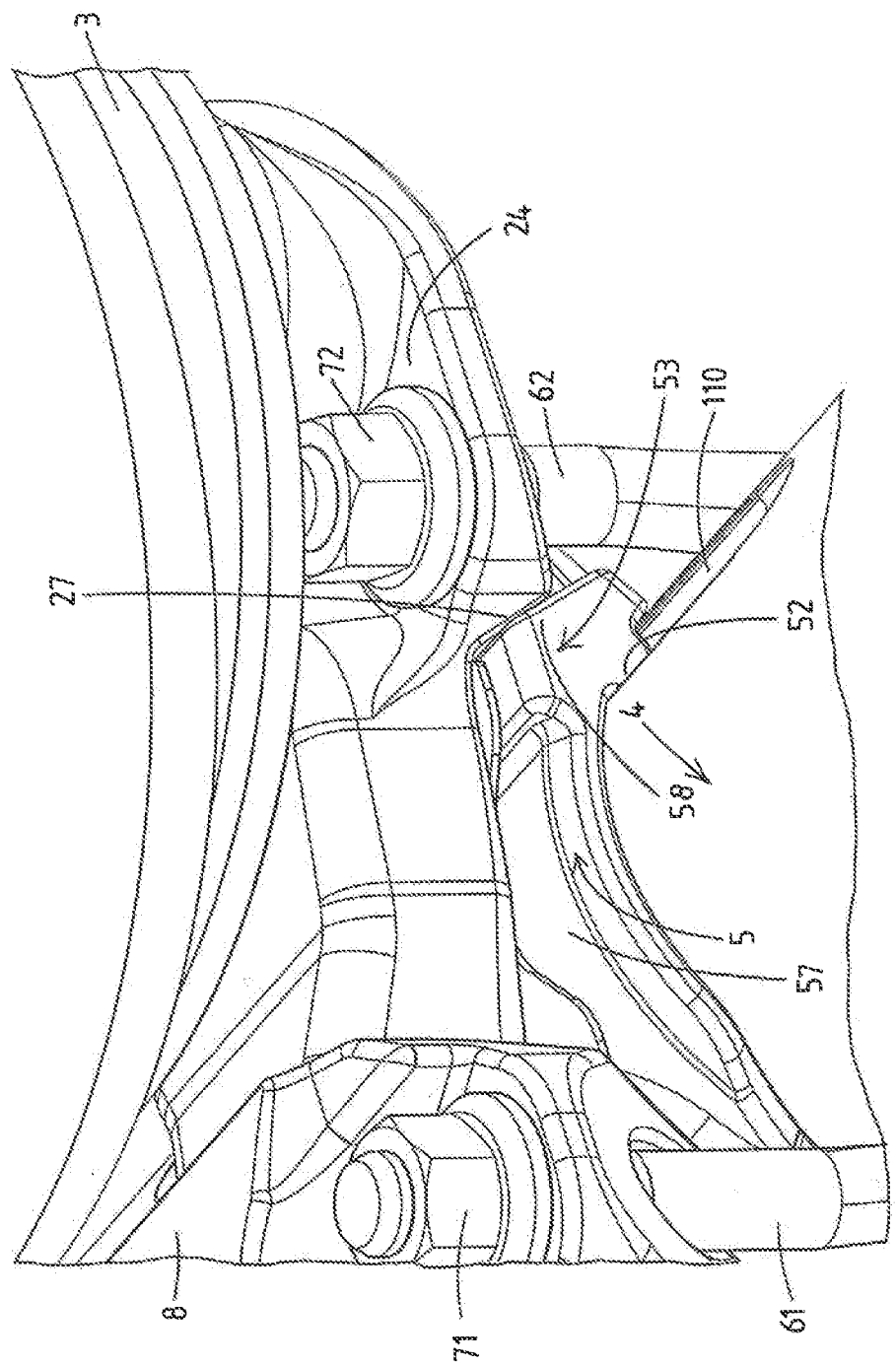
FIG. 5A shows a detail of FIG. 1.
Figure 5B:
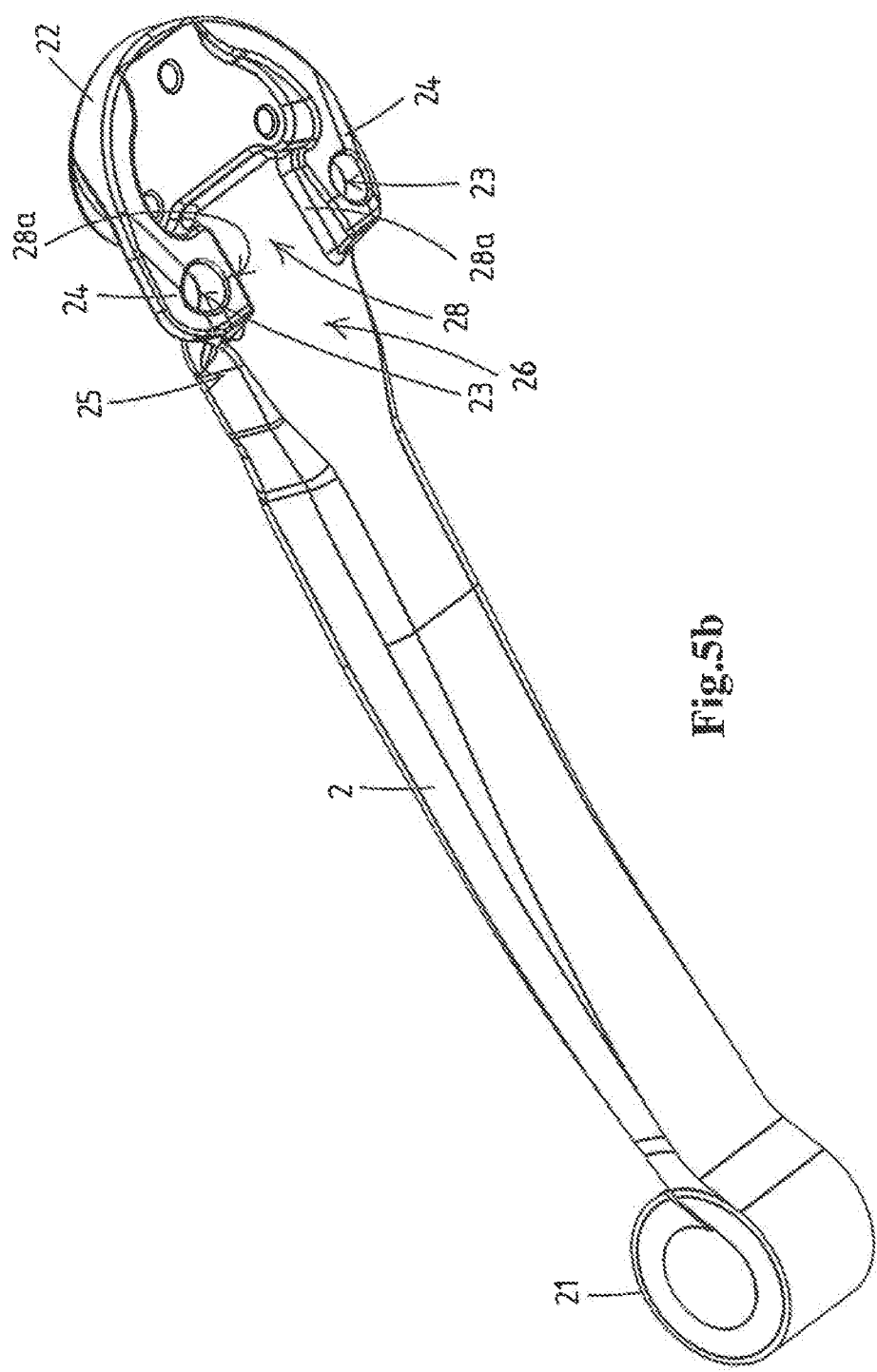
FIG. 5B shows a view in perspective from below of a rear part of a trailing arm of the wheel axle suspension of FIG. 1.

As can be seen best in FIG. 5B, there is provided at the rear end 22 of the trailing arm on either side an ear 24 which extends transversely. The bores 23 for the rear strap legs 62 are provided in the respective ears 24. The ears 24 have an upper surface which is countersunk with respect to the surrounding parts of the upper side of the rear end 22. The countersunk area allows that the end portion of the rear leg 62 and the corresponding nut 72 are arranged at least partially countersunk in the trailing arm 2. This allows that the bellows 3 is positioned more easily in a position overlapping the clamping area between the axle body 4 and the trailing arm 2. In other words, the air spring 3 can be positioned more to the front and the length of the wheel axle suspension is thereby reduced.

The surface area 28 has upstanding lateral sides 28A, visible in FIG. 5B, which retain the axle pad 5 in the lateral direction of the trailing arm.

The axle pad 5 has transversal lugs 58 that engage the ears 24 on an engagement surface 27 (cf. FIG. 5A) of the ear 24 so as to position and retain the axle pad 5 in a predetermined longitudinal position on the trailing arm 2.

Figure 6A:
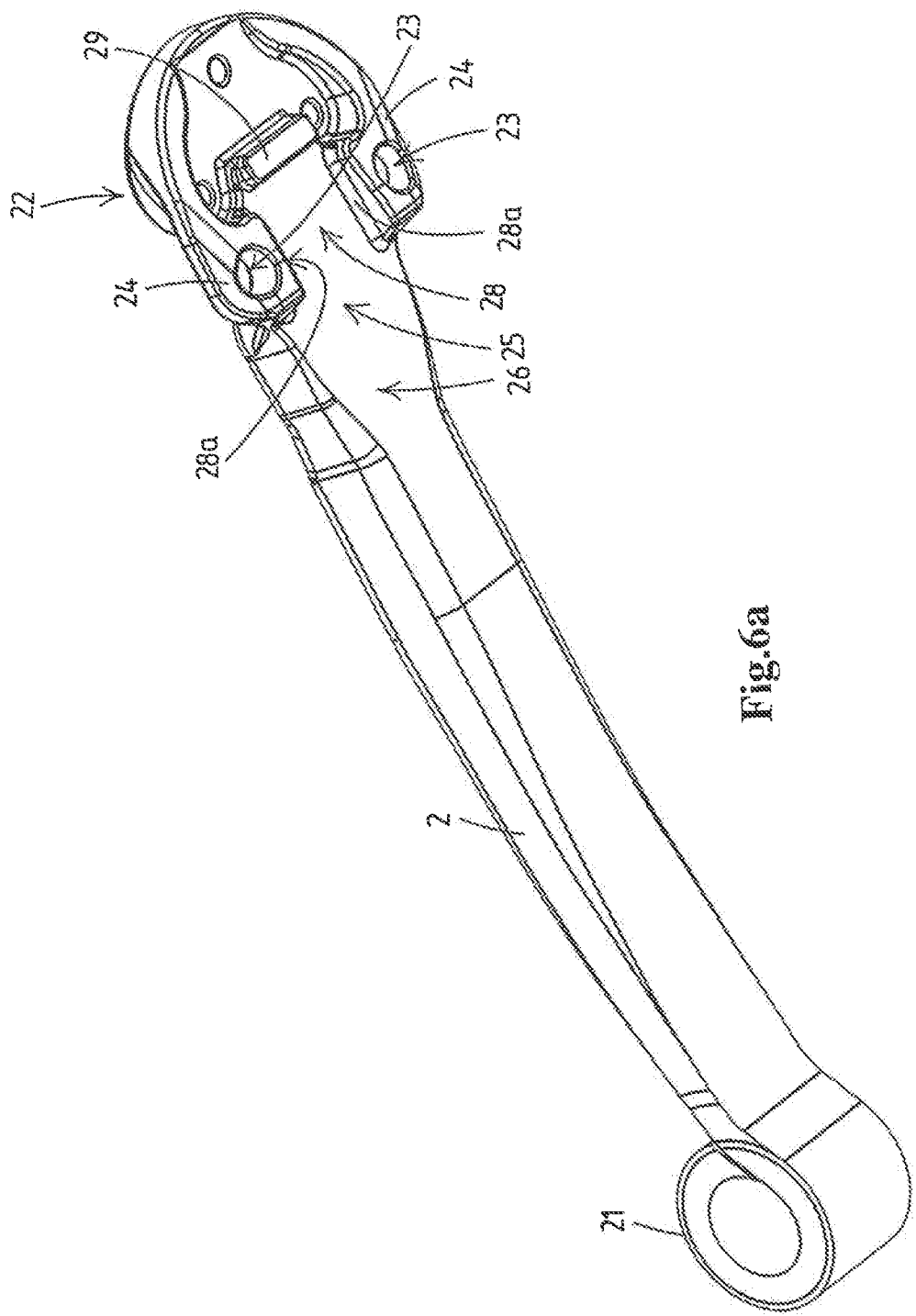
FIG. 6A shows a view in perspective from below of a rear part of a trailing arm of an alternative embodiment of a wheel axle suspension of FIG. 1.

In FIG. 6B is shown in a longitudinal section a rear part of an alternative embodiment of the suspension of FIG. 1. In this embodiment the axle pad 5 does not have the transversal lugs 58 that engage the ears 24 of the trailing arm 2 (cf. FIGS. 1-3). Instead the trailing arm 2 is provided with a recessed surface area 28 in its lower side. In FIG. 6A the trailing arm 2 of FIG. 6B is shown separately. The recessed area 28 has an upstanding rear edge 29 against which the rear edge 59 of the axle pad 5 abuts. When the axle pad 5, or at least a portion thereof is received in the recessed surface area 28 against the rear edge 29, the axle pad 5 is positioned in a predetermined longitudinal position on the trailing arm 2. The recessed surface area 28 has lateral sides 28A, visible in FIG. 6A, which retain the axle pad 5 in the lateral direction of the trailing arm.

In another embodiment, which is not shown it would also be possible that the axle pad has a lug which engages on the front side of the rear leg 62 of the strap 6 to place the axle pad in a predefined longitudinal position on the trailing arm. Possibly there is also a lug provided on the axle pad which engages the rear side of the rear leg 62 of the strap 6. In this way the axle pad is retained in the predefined longitudinal position. By the strap leg 62.

The axle body 4 is provided with an elongated indent 110 in the region where it is attached to the trailing arm 2. The indent 110 constitutes a groove-like recess in the outer surface of the axle body 4. The elongated indent 110 is provided in the axle body 4 by a forming process and extends in a longitudinal direction of the axle body 4.

Figure 7:
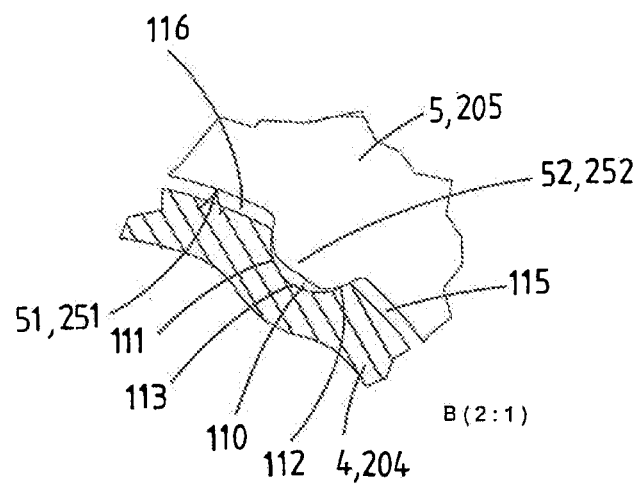
FIG. 7 shows a detail in longitudinal section of the locking between the axle body and the axle pad according to the invention.

As is shown in the cross sectional view of FIG. 7, the indent 110 has a front contact surface 111, a rear contact surface 112 and a bottom surface 113 connecting said front and rear contact surfaces 111, 112. The front contact surface 111, the rear contact surface 112 and the bottom surface 113 together constitute a concave surface of a cylinder segment.

As can be best seen in the sectional view of FIG. 6B, the axle pad 5 comprises a rigid rear portion 53 which comprises a rear engagement zone 54 which engages on the rear half of the axle body 4 and a front portion 55 which comprises a front engagement zone 56 which engages on the front half of the axle body 4. The axle pad 5 furthermore comprises a flexible intermediate portion 57 interconnecting the front 55 and the rear portion 53.

The axle pad 5 surrounds the axle body 4 on 180° or even more of its circumference (cf. FIG. 6B).

An elongate protrusion 52 is provided on the rear portion 53 of the axle pad 5. It extends in a direction parallel to the longitudinal direction of the axle body and projects from the surface 51 of the recess obliquely downwards to the front. Thus, the indent 110 is on the part of the axle body 4 that is facing rearward and upward. In a suspension with flexible trailing arms, the indent and protrusion are preferably not arranged on the front half of the axle body, because the front half experiences more loads and stresses due to the flexibility of the trailing arm.

The elongate protrusion 52 is a sort of spline or wedge, which is shaped in such a way that in the mounted state it only contacts said front and rear contact surfaces 111 and 112 of the indent 11 as is clearly visible in FIG. 7. The protrusion 52 has thus a cross sectional outer contour that is not entirely complementary to the shape of the indent 110. The protrusion 52 will not touch the bottom 113 of the indent 110.

In use when the wheel axle suspension is assembled, the tightening force of the straps 6 forces the axle body 4 in the recess of the axle pad 5. The axle pad 5 will tightly engage at the rear half of the axle body 4 with the rear engagement zone 54. Furthermore the elongate protrusion 52 will be pressed in the indent 110. Due to the shape of the protrusion 52 tolerances in the shape of the indent 110 can be compensated. The rear engagement zone 54 and the protrusion 52 provide thus an unequivocal seating for the axle body 4 in the axle pad 5. In the peripheral area between the rear engagement zone 54 and the protrusion 52 a gap 115 is present between the outer surface of the axle body 4 and the concave surface 51 of the axle pad 5.

The seating of the axle body 4 in the axle pad is completed by the front portion 55 of the axle pad which is substantially rigid and engages the outer surface of the axle body 4 at a front half of the axle body 4 with the front engagement zone 56. In the peripheral area between the front engagement zone 56 and the protrusion 52 a gap 116 is present between the outer surface of the axle body 4 and the concave surface 51 of the axle pad 5.

Because the intermediate portion 57 of the axle pad 5 between the rear and front portions 53 and 55 is relatively flexible by making it relatively thin, the axle pad 5 can deform there under the influence of the tightening force. Thereby the axle pad can compensate for tolerances in the size and shape of the axle body 4 and a tight engagement on the axle body at the front engagement zone 56 is secured.

Figure 8:
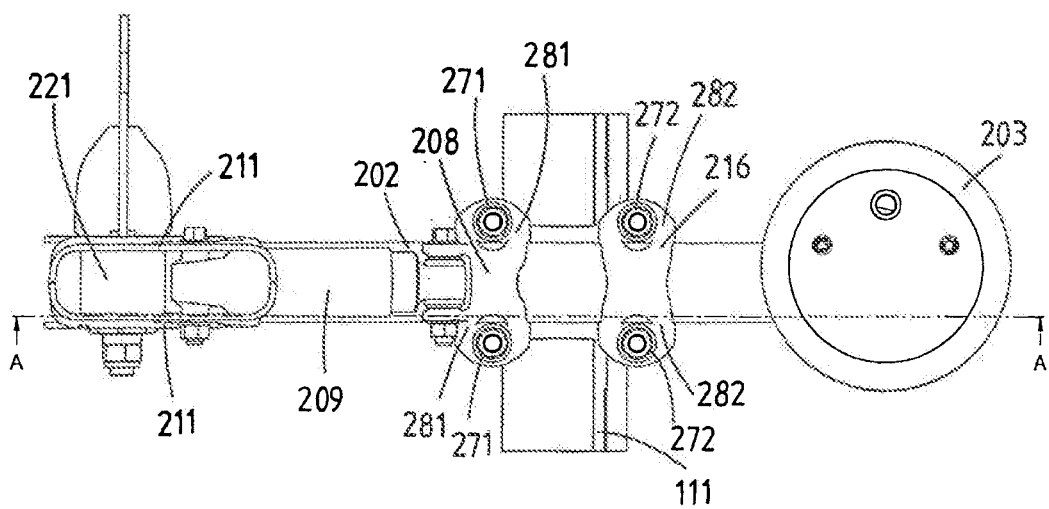
FIG. 8 shows a top elevational view of another possible embodiment of a wheel axle suspension according to the invention.
Figure 9:
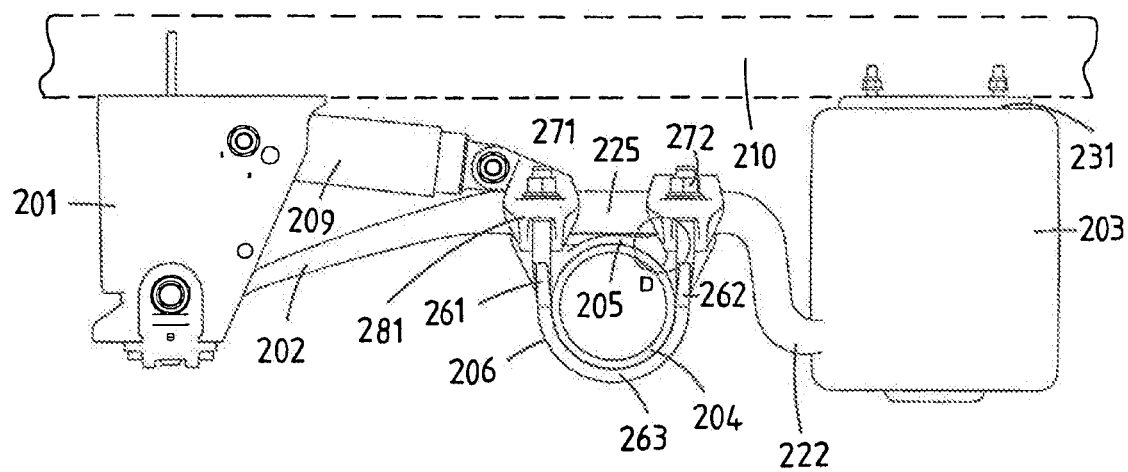
FIG. 9 shows a side elevational view of the wheel axle suspension of FIG. 8.
Figure 10:
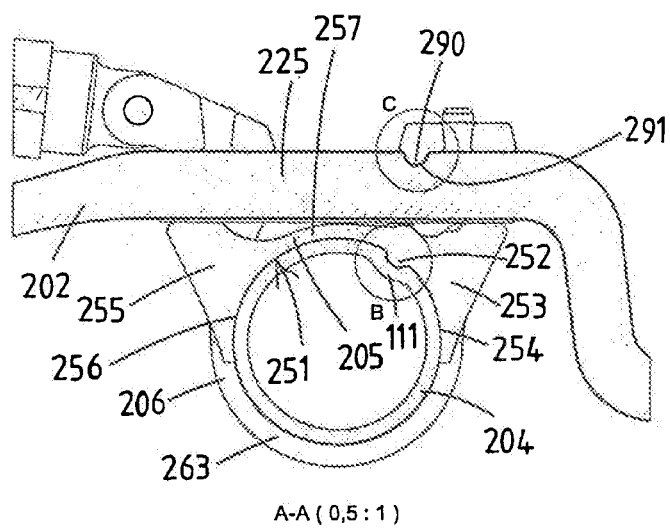
FIG. 10 shows a longitudinal section along the line A-A in FIG. 8 of a part of the wheel axle suspension.
Figure 11:
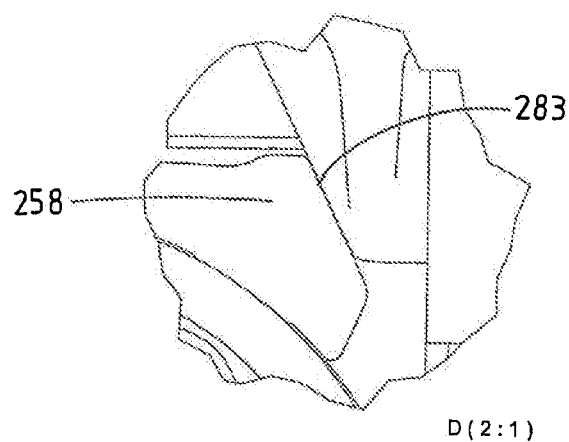
FIG. 11 shows a detail D indicated in FIG. 9.

In FIGS. 8-10 another embodiment of an air-sprung wheel axle suspension according to the invention is shown. This embodiment differs from the embodiment described in the above in that the rear end of the trailing arm is longer and consequently the air spring 3 is positioned at some distance behind the axle body seen in the direction of travel of the vehicle.

The wheel axle suspension of FIGS. 8-10 comprises a carrier bracket 201 with two side plates 211. The carrier bracket 201 is at its upper end attached to the vehicle chassis 210, which is schematically indicated by dashed lines in FIG. 9.

The suspension assembly furthermore comprises a flexible trailing arm 202. The trailing arm 202 has at its front end an attachment eye 221. The trailing arm 202 is hingedly attached to the carrier bracket 201 by a hinge bolt 203 that extends through the attachment eye 221 and bores in the side plates 211 of the carrier bracket 201.

The suspension assembly also comprises an air spring 203 (or bellows), which is attached to a rear end 222 of the trailing arm 202. The air spring 203 has an upper side 231 that is attached to a part of the vehicle chassis 210.

A hollow, relatively thin-walled axle body 204 is provided, which is attached to the trailing arm 202 by means of a clamping assembly. In the shown embodiment the axle body 204 crosses the trailing arm 2 substantially perpendicularly at an attachment portion 225 of the trailing arm. The attachment portion 225 is straight.

An axle pad 205 is provided between the axle body 204 and the trailing arm 202. The axle pad 205 is positioned against the lower side of the trailing arm 202. The axle pad 205 has, at a side facing away from the trailing arm 202, a recess in which part of the circumference of the axle body 204 is received. This is clearly visible in the FIGS. 9 and 10. About 180° or even more of the circumference of the axle body 204 is received in the recess of the axle pad.

The clamping assembly comprises clamping straps 206, which in the embodiment shown are formed as substantially U-shaped straps with a front leg 261 and a rear leg 262 which are interconnected by a bent portion 263 that extends around the lower half of the circumference of the axle body 204. The legs 261 and 262 of the U-shaped straps 206 have near their free ends a threaded portion which can cooperate with a threaded nut 271, 272 respectively so as to tighten the straps 206, in particular the bent portion 263 thereof against the axle body 204.

The clamping assembly also includes a front clamping part 208 and a rear clamping part 216 which will be called a strap plates here.

The front strap plate 208 extends over the upper side of the trailing arm 202 in the width direction and has two side portions 281 that extend beyond the respective sides of the trailing arm 202. The side portions 281 are provided with through bores through which the front legs 261 of the straps 206 pass. The corresponding nuts 271 that are screwed on the front legs 261 of the straps 206 engage an upper side of the strap plate 208, i.e. the side facing away from the trailing atm 202. The strap plate 208 thus constitutes a counter element for allowing to tighten the axle 204, the axle pad 205 and the trailing arm 202 together at the front end of the clamping assembly.

A damper 209 extends between the front strap plate 208 and the carrier bracket 201 and is attached thereto. The damper 209 is not really relevant for the present invention. The rear strap plate 216 also extends over the upper side of the trailing arm 202 in the width direction and has two side portions 282 that extend beyond the respective sides of the trailing arm 202. The side portions 282 are provided with through bores through which the rear legs 262 of the straps 206 pass. The corresponding nuts 272 that are screwed on the front legs 262 of the straps 206 engage an upper side of the strap plate 216, i.e. the side facing away from the trailing arm 202. The strap plate 216 thus constitutes a counter element for allowing to tighten the axle 204, the axle pad 205 and the trailing arm 202 together at the rear end of the clamping assembly.

The straps 206 in this embodiment have strap legs 261, 262 with a same length.

Figure 12:
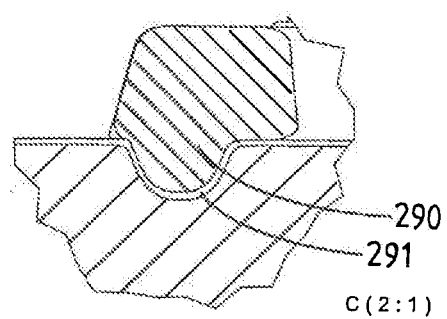
FIG. 12 shows a detail C indicated in FIG. 10.

The rear strap plate 116 has a locking lug 290 which is received in a recess 291 in the upper side of the trailing arm 202 as is shown in the longitudinal sectional view in FIGS. 10 and 12. In this way the clamping strap 216 can be positioned in the longitudinal direction of the trailing arm 202 on a predetermined position.

The strap plate 116 has, at its side portions 282 that extend along the side of the trailing arm 202 towards the axle pad 205, an engagement portion 283. The axle pad 205 has transversal lugs 258, that engage the engagement portion 283 of the strap plate 216 so as to mutually lock the strap plate 216 and the axle pad 205 in a longitudinal direction of the trailing arm 202. Since the strap plate 216 is locked in longitudinal direction with regard to the trailing arm 202 and the axle pad 205 is positioned and retained in a predetermined way against the engagement surface 283 of the strap plate 116 by means of the rear strap leg 262 and the tightened nut 272, the position of the axle pad 205 with respect to the trailing arm 202, in the longitudinal direction of the trailing arm 202 is secured. In this way the position of the axle body 204 with respect to the longitudinal direction of the trailing arm is predetermined.

As can be best seen in the sectional view of FIG. 10, the axle pad 205 comprises a rigid rear portion 253 which comprises a rear engagement zone 254 which engages on the rear half of the axle body 204 and a front portion 255 which comprises a front engagement zone 256 which engages on the front half of the axle body 204. The axle pad 205 furthermore comprises a flexible intermediate portion 257 interconnecting the front portion 255 and the rear portion 253.

An elongate protrusion 252 is provided on the rear portion 253 of the axle pad 205. It extends in a direction parallel to the longitudinal direction of the axle body and projects from the surface 251 of the recess obliquely downwards to the front. The elongate protrusion 252 is a sort of spline or wedge, which is shaped in such a way that in the mounted state it only contacts said front and rear contact surfaces 111 and 112 of the indent 11 as is clearly visible in FIG. 7. The protrusion 252 has thus a cross sectional outer contour that is not entirely complementary to the shape of the indent 110. The protrusion 252 will not touch the bottom 113 of the indent 110.

In use when the wheel axle suspension is assembled, the tightening force of the straps 206 forces the axle body 204 in the recess of the axle pad 205. The axle pad 205 will tightly engage at the rear half of the axle body 204 with the rear engagement zone 254. Furthermore the elongate protrusion 252 will be pressed in the indent 110. Due to the shape of the protrusion 252 tolerances in the shape of the indent 110 can be compensated. The rear engagement zone 254 and the protrusion 252 provide thus an unequivocal seating for the axle body 204 in the axle pad 205. In the peripheral area between the engagement portion zone and the protrusion 252 a gap 115 is present between the outer surface of the axle body 204 and the concave surface 251 of the axle pad 205.

The seating of the axle body 204 in the axle pad is completed by the front portion 255 of the axle pad which is substantially rigid and which engages the outer surface of the axle body 204 at a front half of the axle body 204 with the front engagement zone 256. In the peripheral area between the front engagement zone 256 and the protrusion 252 a gap 116 is present between the outer surface of the axle body 204 and the concave surface 251 of the axle pad 205.

Because the intermediate portion 257 of the axle pad between the rear and front portions 253 and 255 is relatively flexible by making it relatively thin, the axle pad 205 can deform there under the influence of the tightening force. Thereby the axle pad 205 can compensate for tolerances in the size and shape of the axle body 204 and a tight engagement on the axle body 204 at the front engagement zone 256 is secured.

What is claimed is:

1. A wheel axle suspension for attaching a wheel axle to a vehicle chassis, comprising:
   (a) a round tubular axle body;
   (b) a flexible trailing arm with a front end that is hingedly coupled to the chassis and which extends crosswise to the axle body;
   (c) an axle pad which is arranged between the axle body and the trailing arm, which has a recess in which part of the circumference of the axle body is received, and which has a side facing away from the axle body that engages the trailing arm; and
   (d) a clamping assembly extending around the axle body for tightening the axle body, the axle pad and the trailing arm together,
   (e) wherein the axle body is provided with an elongated indent in the region where it is clamped, which indent extends in a longitudinal direction of the axle body,
   (f) wherein the axle pad has an elongate protrusion located in the recess, which protrusion fits in the indent in the axle body, a rigid rear portion which comprises a rear engagement zone which engages on the rear half of the axle body and a front portion which comprises a front engagement zone which engages on the front half of the axle body, and wherein the axle pad comprises a flexible intermediate portion interconnecting the front and the rear portion.

2. The wheel axle suspension according to claim 1, wherein the indent has a front contact surface, a rear contact surface and a bottom surface connecting said front and rear contact surfaces, wherein the elongate protrusion is shaped in such a way that in the mounted state it only contacts said front and rear contact surfaces of the indent.

3. The wheel axle suspension according to claim 2, wherein the indent has a substantially cylindrical concave surface.

4. The wheel axle suspension according to claim 1, wherein the recess of the axle pad has an axle body facing surface comprising:
   the front engagement zone;
   the rear engagement zone;
   a zone between the front engagement zone and the protrusion where the axle body facing surface and the outer surface of axle body are spaced apart; and
   a zone between the rear engagement zone and the protrusion where the axle body facing surface and the outer surface of axle body are spaced apart.

5. The wheel axle suspension according to claim 1, wherein the flexible trailing arm is substantially straight at the portion thereof where the axle body is attached to it.

6. The wheel axle suspension according to claim 5, wherein the clamping assembly comprises clamping straps as well as a strap plate which lies on a side of the trailing arm opposite the side where the axle pad is located, wherein the strap plate has side portions that extend along the side of the trailing arm towards the axle pad, and wherein the axle pad has transversal lugs, that engage the side portions of the strap plate so as to mutually lock the strap plate and the axle pad in a longitudinal direction of the trailing arm, and wherein the strap plate has at least one locking lug and the trailing arm has at least one recess which receives the locking lug of the strap plate, so as to lock the strap plate with respect to the trailing arm in the longitudinal direction of the trailing arm.

7. The wheel axle suspension according to claim 1, wherein the trailing arm has transversely extending ears on either side of the trailing arm, and wherein the axle pad has transversal lugs that engage the ears so as to position the axle pad in a predetermined longitudinal position on the trailing arm.

8. The wheel axle suspension according to claim 7, wherein the ears are provided with a bore through which passes a shank of a tightening member.

9. The wheel axle suspension according to claim 7, wherein the transversal lugs are provided on the rigid rear portion of the axle pad.

10. The wheel axle suspension according to claim 1, wherein the trailing arm is provided with a recessed surface area in its lower side in which a portion of the axle pad is received so as to position the axle pad in a predetermined longitudinal position on the trailing arm.

11. The wheel axle suspension according to claim 1, wherein the elongate protrusion is located at the rigid rear portion of the axle pad.

12. A vehicle comprising the wheel axle suspension according to claim 1.

13. A wheel axle suspension for attaching a wheel axle to a vehicle chassis, comprising:
   (a) a round tubular axle body;

(b) a flexible trailing arm with a front end that is hingedly coupled to the chassis and which extends crosswise to the axle body;

(c) an axle pad which is arranged between the axle body and the trailing arm, which has a recess in which part of the circumference of the axle body is received, and which has a side facing away from the axle body that engages the trailing arm; and (d) a clamping assembly extending around the axle body for tightening the axle body, the axle pad and the trailing arm together, (e) wherein the axle body is provided with an elongated indent in the region where it is clamped, which indent extends in a longitudinal direction of the axle body, (f) wherein the axle pad has an elongate protrusion located in the recess, which protrusion fits in the indent in the axle body, (g) wherein the clamping assembly comprises clamping straps as well as a strap plate which lies on a side of the trailing arm opposite the side where the axle pad is located, wherein the strap plate has side portions that extend along the side of the trailing arm towards the axle pad, and wherein the axle pad has transversal lugs that engage the side portions of the strap plate so as to mutually lock the strap plate and the axle pad in a longitudinal direction of the trailing arm, and wherein the strap plate has at least one locking lug and the trailing arm has at least one recess which receives the locking lug of the strap plate, so as to lock the strap plate with respect to the trailing arm in the longitudinal direction of the trailing arm.

14. A vehicle comprising the wheel axle suspension according to claim 13.

* * * * *